United States Patent
Chen et al.

(10) Patent No.: US 12,136,848 B2
(45) Date of Patent: Nov. 5, 2024

(54) BATTERY ASSEMBLY AND ENERGY STORAGE SYSTEM

(71) Applicant: Huawei Digital Power Technologies Co., Ltd., Shenzhen (CN)

(72) Inventors: Baoguo Chen, Dongguan (CN); Jianhua Zhu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 156 days.

(21) Appl. No.: 18/152,278

(22) Filed: Jan. 10, 2023

(65) Prior Publication Data
US 2023/0163626 A1 May 25, 2023

Related U.S. Application Data

(63) Continuation of application No. PCT/CN2020/102403, filed on Jul. 16, 2020.

(51) Int. Cl.
*H02J 9/06* (2006.01)
*H02J 7/00* (2006.01)
*H02M 3/00* (2006.01)

(52) U.S. Cl.
CPC .......... *H02J 9/061* (2013.01); *H02J 7/00032* (2020.01); *H02J 7/0029* (2013.01); *H02J 7/0047* (2013.01); *H02M 3/003* (2021.05)

(58) Field of Classification Search
CPC ...... H02J 9/061; H02J 7/00032; H02J 7/0029; H02J 7/0047; H02M 3/003
USPC .......................................... 307/66
See application file for complete search history.

(56) References Cited

U.S. PATENT DOCUMENTS

| 8,842,404 | B2 | 9/2014 | Vogel |  |
|---|---|---|---|---|
| 2015/0092311 | A1 | 4/2015 | Wang et al. |  |
| 2016/0087421 | A1* | 3/2016 | Chatroux | B60L 3/04 |
|  |  |  |  | 361/87 |
| 2018/0048182 | A1* | 2/2018 | Chan | H02J 1/02 |
| 2018/0056806 | A1* | 3/2018 | Dulle | H02J 9/061 |
| 2019/0092257 | A1* | 3/2019 | Boecker | H02J 9/061 |

FOREIGN PATENT DOCUMENTS

| CN | 103928964 A | 7/2014 |
|---|---|---|
| CN | 103972979 A | 8/2014 |
| CN | 103928958 B | 2/2016 |
| CN | 106532889 A | 3/2017 |
| CN | 108340788 A | 7/2018 |

(Continued)

*Primary Examiner* — Alfonso Perez Borroto
(74) *Attorney, Agent, or Firm* — Maier & Maier, PLLC

(57) ABSTRACT

The battery assembly includes a control unit and a DCDC converter. The control unit is configured to, when a first load is short-circuited in a process in which the battery assembly supplies power to the first load, control the DCDC converter to output a first current. The first current is greater than a maximum nominal discharge current of the battery assembly, is used to break an electrical connection between the first load and a busbar, and is less than a short-circuit protection current of the battery assembly; and/or the control unit is configured to, after a power supply encounters a power failure, control a discharge capability of the battery assembly to be greater than a maximum nominal discharge capability of the battery assembly, and supply power to a first load and a second load by using a DCDC converter.

12 Claims, 4 Drawing Sheets

(56) References Cited

FOREIGN PATENT DOCUMENTS

| | | | |
|---|---|---|---|
| FR | 3005534 | A1 | 11/2014 |
| KR | 100713117 | B1 | 5/2007 |
| KR | 1020180092508 | A | 8/2018 |

* cited by examiner

BATTERY ASSEMBLY AND ENERGY STORAGE SYSTEM

CROSS-REFERENCE TO RELATED APPLICATIONS

This application is a continuation of International Application No. PCT/CN2020/102403, filed on Jul. 16, 2020, the disclosure of which is hereby incorporated by reference in its entirety.

TECHNICAL FIELD

The embodiments relate to the field of energy technologies, a battery assembly, and an energy storage system.

BACKGROUND

A battery assembly such as a lead-acid battery or a lithium battery is widely applied to various power backup scenarios. However, in an actual application process, usually, a load is short-circuited and/or a power supply encounters a power failure, and consequently, a system easily breaks down.

SUMMARY

The embodiments may provide a battery assembly and an energy storage system, to resolve a phenomenon that the energy storage system breaks down when a load is short-circuited and/or a power supply encounters a power failure. The battery assembly has a characteristic of a short-circuit current-limitation output when the load is short-circuited, and can output a discharge current whose amplitude is greater than a maximum nominal discharge current of the battery assembly and less than a short-circuit protection current of the battery assembly, so that the load is cut off from the energy storage system before the battery assembly, and a busbar voltage in the energy storage system can be automatically restored. In addition, the battery assembly has a short-time overload discharge capability after the power supply encounters the power failure. A discharge capability of the battery assembly can be improved in a time period from a time point at which the power supply encounters the power failure to a time point at which a secondary load is powered off, so that the battery assembly supplies power to both a primary load and the secondary load, to ensure that the energy storage system does not break down. In addition, a maximum nominal discharge capability of the battery assembly can be restored after the power supply encounters the power failure until the secondary load is powered off, so that the battery assembly supplies power to the primary load, to ensure power backup duration of the primary load.

According to a first aspect, the embodiments may provide a battery assembly, including a control unit and a DCDC converter.

The control unit is configured to: when a first load is short-circuited in a process in which the battery assembly supplies power to the first load, control the DCDC converter to output a first current. The first current is greater than a maximum nominal discharge current of the battery assembly, is used to break an electrical connection between the first load and a busbar, and is less than a short-circuit protection current of the battery assembly; the maximum nominal discharge current of the battery assembly is a maximum current allowed when the battery assembly is normally discharged; and the short-circuit protection current of the battery assembly is a current that can be used to break an electrical connection between the battery assembly and the busbar.

The battery assembly provided in the first aspect has a characteristic of a short-circuit current-limitation output. The battery assembly can continue current-limitation operation when any one load is short-circuited, an amplitude of a discharge current output by the battery assembly is greater than the maximum nominal discharge current of the battery assembly and less than the short-circuit protection current of the battery assembly, and duration of the discharge current of the battery assembly is stable and controllable, so that when the any one load is short-circuited, the short-circuited load is cut off from an energy storage system before the battery assembly, and a busbar voltage in the energy storage system can be automatically restored.

The battery assembly may further include a battery pack; a first end of the DCDC converter is electrically connected to a positive electrode of the battery pack, a second end of the DCDC converter is electrically connected to a negative electrode of the battery pack, a third end of the DCDC converter is electrically connected to a first busbar, a fourth end of the DCDC converter is electrically connected to a second busbar, a fifth end of the DCDC converter is electrically connected to the control unit, the first busbar and the second busbar are configured to provide a direct current, and the first load is electrically connected in parallel between the first busbar and the second busbar; the control unit may be configured to: when the first load is short-circuited, control, based on a third pulse width of a first signal, the DCDC converter to decrease equivalent output impedance of the battery assembly, to control a discharge current of the battery assembly to be the first current; and the first signal represents a duty cycle of a power switching transistor in the DCDC converter, and a pulse width of the first signal is used to adjust the equivalent output impedance of the battery assembly, to control the discharge current of the battery assembly. Therefore, the control unit in the battery assembly controls the duty cycle of the power switching transistor in the DCDC converter, so that the discharge current output by the battery assembly is the first current, to provide a possible implementation in which the battery assembly outputs the first current.

The control unit may be configured to: monitor a port voltage of the battery assembly in a discharging state; and when the port voltage of the battery assembly in the discharging state is less than or equal to a first preset voltage, determine that the first load is short-circuited, and control the battery assembly to output the first current. Therefore, the control unit in the battery assembly can determine, based on the port voltage of the battery assembly in the discharging state, whether a load is short-circuited, to control the discharge current output by the DCDC converter to be the first current in a timely manner. Therefore, the control unit can determine whether the load is short-circuited, to control, to be the first current in a timely manner, the discharge current that is of the battery assembly and that is output by the DCDC converter.

According to a second aspect, the embodiments may provide a battery assembly, including a control unit and a DCDC converter.

The control unit is configured to: after a power supply encounters a power failure, control a discharge capability of the battery assembly to be greater than a maximum nominal discharge capability of the battery assembly, and supply power to a first load and a second load by using a DCDC converter; and after the first load is powered off, control the discharge capability of the battery assembly to be restored to the maximum nominal discharge capability, and supply power to the second load by using the DCDC converter, where the power supply is configured to provide a direct current to the first load and the second load before the power supply encounters the power failure, and power is supplied to the second load before the first load.

Based on the battery assembly provided in the second aspect, a monitoring unit in an energy storage system controls, by using the power failure alarm signal, a secondary load to be powered off, to ensure power backup duration of a primary load. In addition, the battery assembly has a short-time overload discharge capability. In a time period from a time point at which the power supply encounters the power failure to a time point at which the secondary load is powered off, a discharge capability (for example, a discharge power or a discharge current) of the battery assembly is greater than the maximum nominal discharge capability (for example, a maximum nominal discharge power or a maximum nominal discharge current) of the battery assembly, and the discharge capability (for example, the discharge power or the discharge current) of the battery assembly is stable and controllable. Therefore, the battery assembly supplies power to both the primary load and the secondary load in the time period from the time point at which the power supply encounters the power failure to the time point at which the secondary load is powered off, to ensure that the energy storage system does not break down. After the power supply encounters the power failure until the secondary load is powered off, the discharge capability (for example, the discharge power or the discharge current) of the battery assembly is restored to the maximum nominal discharge capability (for example, the maximum nominal discharge power or the maximum nominal discharge current) of the battery assembly, so that the battery assembly supplies power to the primary load, to ensure the power backup duration of the primary load.

When the discharge capability of the battery assembly is represented by using a discharge power of the battery assembly, the control unit may be configured to: after the power supply encounters the power failure, control the discharge power of the battery assembly to be greater than a maximum nominal discharge power in a time period from a time point at which the power supply encounters the power failure to a time point at which the first load is powered off, where the maximum nominal discharge power is a maximum power allowed when the battery assembly is normally discharged; and after the first load is powered off, control the battery assembly to be restored to the maximum nominal discharge power. Therefore, the discharge power of the battery assembly is used to represent the discharge capability of the battery assembly, to provide a possible implementation of adjusting the discharge capability of the battery assembly.

Alternatively, when the discharge capability of the battery assembly is represented by using a discharge current of the battery assembly, the control unit is configured to: after the power supply encounters the power failure, control the discharge current of the battery assembly to be greater than a maximum nominal discharge current in a time period from a time point at which the power supply encounters the power failure to a time point at which the first load is powered off, where the maximum nominal discharge current is a maximum current allowed when the battery assembly is normally discharged; and after the first load is powered off, control the battery assembly to be restored to the maximum nominal discharge current. Therefore, the discharge current of the battery assembly is used to represent the discharge capability of the battery assembly, to provide another possible implementation of adjusting the discharge capability of the battery assembly.

The first load may be used to implement a 5G data service and the second load may be used to implement a voice service and a transmission service that are different from the 5G data service.

The control unit may be further configured to: when a port voltage of the battery assembly in a charging state or a standby state is less than or equal to a second preset voltage, control the discharge capability of the battery assembly to be greater than the maximum nominal discharge capability of the battery assembly. Therefore, the control unit can determine whether the power supply encounters the power failure, to improve the discharge capability of the battery assembly in a timely manner.

The battery assembly may further include a battery pack; a first end of the DCDC converter is electrically connected to a positive electrode of the battery pack, a second end of the DCDC converter is electrically connected to a negative electrode of the battery pack, a third end of the DCDC converter is electrically connected to a first busbar, a fourth end of the DCDC converter is electrically connected to a second busbar, a fifth end of the DCDC converter is electrically connected to the control unit, the first busbar and the second busbar are configured to provide a direct current by using the power supply, and the first load and the second load are electrically connected in parallel between the first busbar and the second busbar; the control unit may be configured to control, based on a first pulse width of a first signal, the DCDC converter to decrease equivalent output impedance of the battery assembly, to control the discharge capability of the battery assembly to be greater than the maximum nominal discharge capability of the battery assembly; and after preset duration, control, based on a second pulse width of the first signal, the DCDC converter to increase the equivalent output impedance of the battery assembly, to control the discharge capability of the battery assembly to be restored to the maximum nominal discharge capability of the battery assembly; and the first pulse width is greater than or equal to the second pulse width, and a pulse width of the first signal is used to adjust the equivalent output impedance of the battery assembly, to control the discharge power or the discharge current of the battery assembly. Therefore, the control unit in the battery assembly controls a duty cycle of a power switching transistor in the DCDC converter, to change the discharge capability of the battery assembly, so as to provide a possible implementation of adjusting the discharge capability of the battery assembly.

According to a third aspect, the embodiments may provide an energy storage system, including a power supply assembly, a first busbar, a second busbar, and the battery assembly in the first aspect; and/or the power supply assembly, the first busbar, the second busbar, and the battery assembly in the second aspect.

The energy storage system may further include a monitoring unit, and the monitoring unit is electrically connected to the power supply assembly; the power supply component is configured to send a power failure alarm signal to the monitoring unit after a power supply encounters a power failure; and the monitoring unit is further configured to: when receiving the power failure alarm signal, control a secondary load in an electrical load to be powered off. Therefore, when the power supply encounters the power failure, the monitoring unit can control the secondary load to be powered off in a timely manner, so that the battery assembly does not need to have a long-time overload discharge capability, to avoid damage to the battery assembly.

The energy storage system includes any one of the following: a data center, a communications station, or an energy storage power station.

For beneficial effects of the energy storage system provided in the third aspect, refer to beneficial effects brought by the first aspect and the second aspect. Details are not described herein again.

DETAILED DESCRIPTION OF THE EMBODIMENTS

Figure 1:
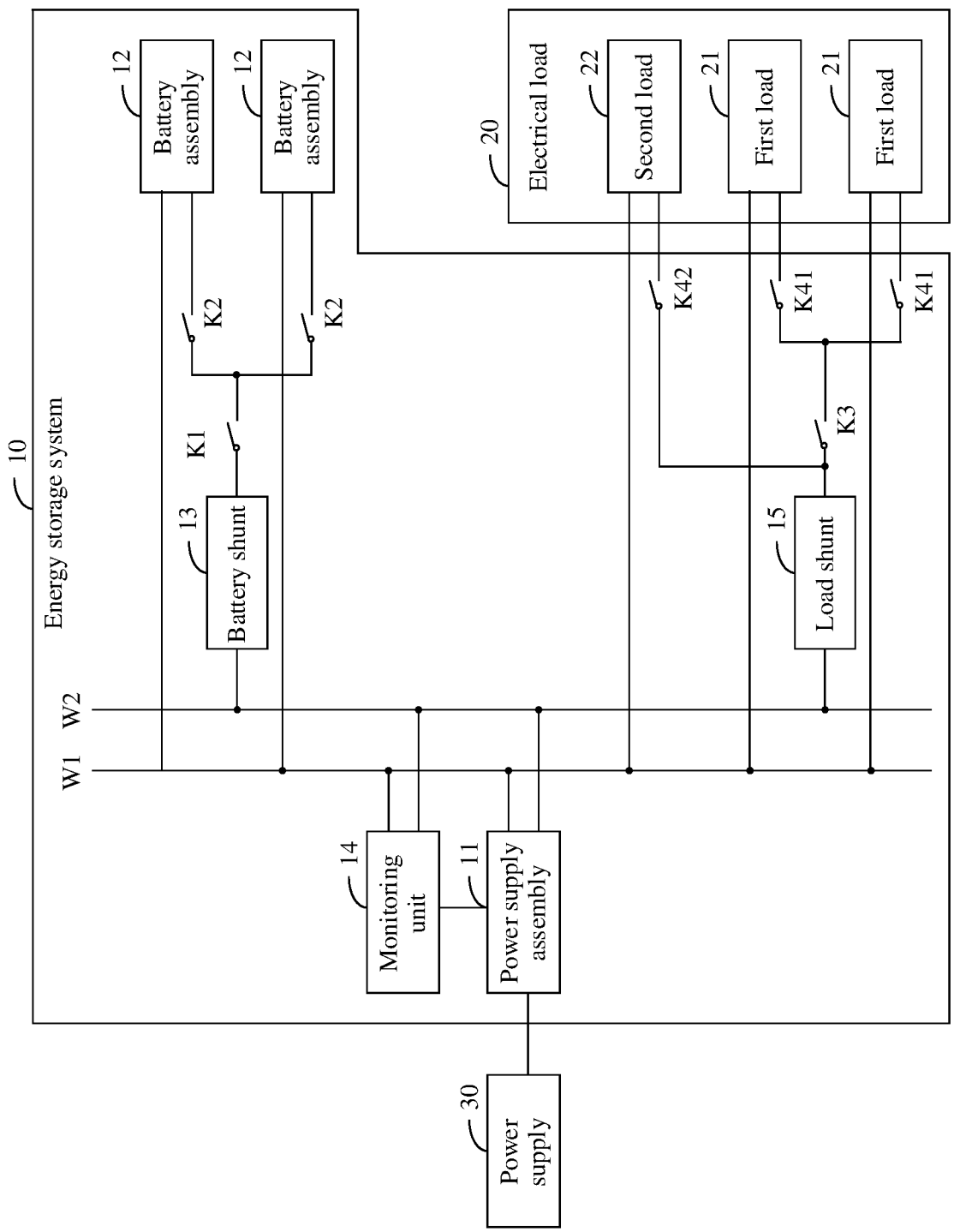
FIG. 1 is a schematic diagram of a structure of an energy storage system according to an embodiment.

The embodiments may provide a battery assembly and an energy storage system and may be applied to various power backup scenarios such as a communications station, a data center, and an energy storage power station. The battery assembly has a characteristic of a short-circuit current-limitation output. The battery assembly can continue current-limitation operation when any one load is short-circuited, an amplitude of a discharge current output by the battery assembly is greater than a maximum nominal discharge current of the battery assembly and less than a short-circuit protection current of the battery assembly, and duration of the discharge current of the battery assembly is stable and controllable, so that when the any one load is short-circuited, the short-circuited load is cut off from the energy storage system before the battery assembly, and a busbar voltage in the energy storage system can be automatically restored.

In addition, a monitoring unit in the energy storage system controls, by using a power failure alarm signal, a secondary load to be powered off, to ensure power backup duration of a primary load. In addition, the battery assembly has a short-time overload discharge capability. In a time period from a time point at which a power supply encounters a power failure to a time point at which the secondary load is powered off, a discharge capability (for example, a discharge power or a discharge current) of the battery assembly may be greater than a maximum nominal discharge capability (for example, a maximum nominal discharge power or a maximum nominal discharge current) of the battery assembly, and the discharge capability (for example, the discharge power or the discharge current) of the battery assembly may be stable and controllable. Therefore, the battery assembly supplies power to both the primary load and the secondary load in the time period from the time point at which the power supply encounters the power failure to the time point at which the secondary load is powered off, to ensure that the energy storage system does not break down. After the power supply encounters the power failure until the secondary load is powered off, the discharge capability (for example, the discharge power or the discharge current) of the battery assembly is restored to the maximum nominal discharge capability (for example, the maximum nominal discharge power or the maximum nominal discharge current) of the battery assembly, so that the battery assembly supplies power to the primary load, to ensure the power backup duration of the primary load.

Whether power is preferentially supplied to a load may be set based on a degree of importance of a service of the load. Usually, power is preferentially supplied to a load corresponding to a higher degree of importance of a service. In other words, power is supplied to the primary load before the secondary load. In addition, types of the secondary load and the primary load are not limited.

The following separately describes in detail implementations of a battery assembly 12 and an energy storage system 10 with reference to the embodiments.

FIG. 1 is a schematic diagram of a structure of an energy storage system according to an embodiment. As shown in FIG. 1, an energy storage system 10 may include a power supply assembly 11, a first busbar W1, a second busbar W2, and at least one battery assembly 12. An implementation of the energy storage system 10 is not limited. In some embodiments, the energy storage system 10 may include any one of the following: a data center, a communications station, or an energy storage power station.

The first busbar W1 and the second busbar W2 are used to provide a direct current. A busbar voltage in the energy storage system 10 is a voltage between the first busbar W1 and the second busbar W2. The battery assembly 12 may be electrically connected in parallel between the first busbar W1 and the second busbar W2, so that the battery assembly 12 can be charged or discharged. In addition, an electrical load 20 is also electrically connected in parallel between the first busbar W1 and the second busbar W2, so that the electrical load 20 can obtain electrical energy. It should be noted that an electrical connection between the battery assembly 12 and a busbar is broken is illustrated by using an example in which an electrical connection between the battery assembly 12 and the second busbar W2 is broken, and that an electrical connection between the electrical load 20 and a busbar is illustrated by using an example in which an electrical connection between the electrical load 20 and the second busbar W2 is broken.

A quantity of battery assemblies 12 and an implementation structure may not be limited. When there is more than one battery assembly 12, still referring to FIG. 1, the energy storage system 10 may further include a battery shunt 13 and a battery low voltage down (BLVD) contactor K1. In addition, when the battery assembly 12 is electrically connected in parallel between the first busbar W1 and the second busbar W2, a switching module K2 is usually added between the battery assembly 12 and the second busbar W2, to protect the battery assembly 12. For ease of description, two battery assemblies 12 are used for illustration in FIG. 1, and each battery assembly 12 is electrically connected to the second busbar W2 by using the switching module K2, the BLVD contactor K1, and the battery shunt 13.

Figure 2A:
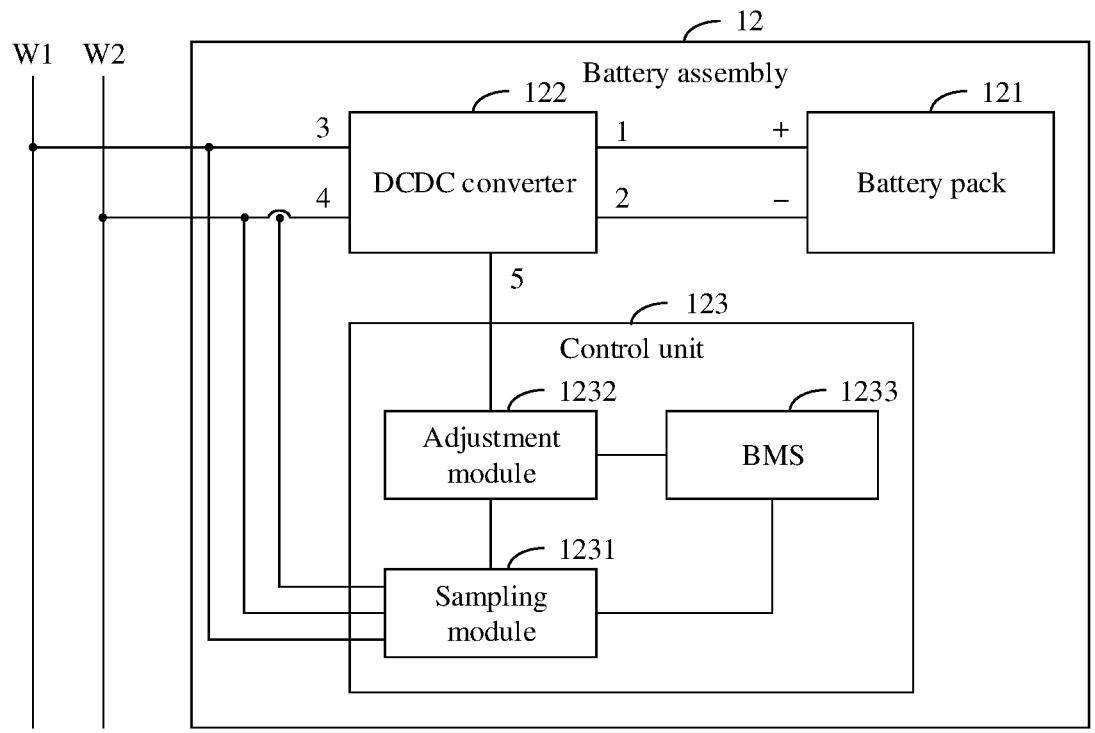
FIG. 2A is a schematic diagram of a structure of a battery assembly according to an embodiment.

The following describes an implementation structure of the battery assembly 12 with reference to FIG. 2A. It should be noted that the switching module K2, the battery shunt 13, and the BLVD contactor K1 in FIG. 2A are not illustrated.

FIG. 2A is a schematic diagram of a structure of a battery assembly according to an embodiment. As shown in FIG. 2A, the battery assembly 12 may include a battery pack 121, a direct current-direct current (DCDC) converter 122), and a control unit 123.

A first end 1 of the DCDC converter 122 is electrically connected to a positive electrode (+) of the battery pack 121, a second end 2 of the DCDC converter 122 is electrically connected to a negative electrode (−) of the battery pack 121, a third end 3 of the DCDC converter 122 is electrically connected to the first busbar W1, a fourth end 4 of the DCDC converter 122 is electrically connected to the second busbar W2, and a fifth end 5 of the DCDC converter 122 is electrically connected to the control unit 123.

An implementation of the battery pack 121 is not limited. In some embodiments, the battery pack 121 may include at least one electrochemical cell. When the battery pack 121 includes a plurality of electrochemical cells, the plurality of electrochemical cells may be electrically connected in series; or the plurality of electrochemical cells may be electrically connected in parallel; or the plurality of electrochemical cells may be electrically connected in series and in parallel. In addition, a type of the electrochemical cell is not limited. For example, the type of the electrochemical cell may be a lithium battery.

An implementation of the DCDC converter 122 is not limited. In some embodiments, the DCDC converter 122 may include any one of the following: a buck converter circuit (Buck circuit), a boost converter circuit (Boost circuit), a buck-boost converter circuit (Buck-Boost circuit), a flyback circuit, a forward circuit, a half-bridge topology, a full-bridge topology, and an isolated or non-isolated circuit including at least one of the topologies.

The control unit 123 may be an integrated chip, for example, a microcontroller unit (MCU) or a system on a chip SoC) or may be formed by combining a plurality of components or may be formed by combining an integrated chip and a peripheral circuit. This is not limited.

In some embodiments, the control unit 123 may include a sampling module 1231, an adjustment module 1232, and a battery management system (BMS) 1233.

The sampling module 1231 is configured to: collect a discharge current of the battery assembly 12 and collect a port voltage of the battery assembly 12 based on the first busbar W1 and the second busbar W2 (for example, a voltage between the third end 3 and the fourth end 4 of the DCDC converter 122). The sampling module 1231 sends the discharge current and the port voltage of the battery assembly 12 to the adjustment module 1232. The port voltage of the battery assembly 12 may include a port voltage of the battery assembly 12 in a discharging state, and a port voltage of the battery assembly 12 in a charging state or a standby state.

The adjustment module 1232 is configured to: determine, based on the port voltage of the battery assembly 12 in the discharging state and a first preset voltage, whether the electrical load 20 is short-circuited, and when the port voltage of the battery assembly 12 in the discharging state is less than or equal to the first preset voltage, determine that the electrical load 20 is short-circuited. The first preset voltage may be configured based on a length of a line between the battery assembly 12 and the second busbar W2.

The adjustment module 1232 is further configured to: calculate a first signal based on the discharge current of the battery assembly 12 or calculate a first signal based on the discharge current of the battery assembly 12 and the port voltage of the battery assembly 12 in the discharging state. For example, the adjustment module 1232 obtains the first signal through single-loop or multi-loop proportional-integral-derivative control (proportional-integral-derivative control, PID control). The adjustment module 1232 outputs the first signal to the DCDC converter 122.

The first signal represents a duty cycle of a power switching transistor in the DCDC converter 122, and the first signal is used to adjust equivalent output impedance of the battery assembly 12, to control a discharge power or the discharge current of the battery assembly 12. An implementation of the first signal is not limited. For example, the first signal may be a pulse width modulated (PWM) signal.

The adjustment module 1232 is further configured to determine, based on the port voltage of the battery assembly 12 in the charging state or the standby state, whether a power supply 30 encounters a power failure, so that the battery assembly 12 determines whether to be charged, to be in a standby state, or to be discharged. For example, the adjustment module 1232 may preconfigure a second preset voltage. A value of the second preset voltage is not limited. Usually, the second preset voltage is slightly less than the port voltage of the battery assembly 12 in the charging state or the standby state. When the port voltage of the battery assembly 12 in the charging state or the standby state is less than or equal to the second preset voltage, the adjustment module 1232 may determine that the power supply power 30 encounters the power failure, so that the battery assembly 12 may transition from the charging state or the standby state to the discharging state. The charging state may be understood as a float charging state or an equalized charging state, and the standby state may be understood as a case in which a charging channel of the battery assembly 12 is broken and a discharging channel of the battery assembly 12 is conducted, in other words, the battery assembly 12 cannot be charged and can be discharged.

The BMS 1233 is configured to manage a chargeable and dischargeable capacity of the battery pack 121 and another battery management function. The BMS 1233 may be implemented by using a software algorithm and/or a hardware circuit.

Based on the foregoing descriptions, the control unit 123 is configured to: determine, based on the port voltage of the battery assembly 12 in the discharging state and the first preset voltage, whether the electrical load 20 is short-circuited, and when the port voltage of the battery assembly 12 in the discharging state is less than or equal to the first preset voltage, determine that the electrical load 20 is short-circuited. Therefore, the control unit 123 may control the DCDC converter 122 to adjust the equivalent output impedance of the battery assembly 12 based on the first signal, so that the discharge current of the battery assembly 12 changes.

In addition, the control unit 123 may determine, based on the port voltage of the battery assembly 12 in the charging state or the standby state and the second preset voltage, whether the power supply power supply 30 encounters the power failure, so that the battery assembly 12 determines whether to be charged, to be in a standby state, or to be discharged. In addition, when the port voltage of the battery assembly 12 in the charging state or the standby state is less than or equal to the second preset voltage, the control unit 30 determines that the power supply 30 encounters the power failure, and the battery assembly 12 may transition from the charging state or the standby state to the discharging state. Therefore, the control unit 123 may control, based on the first signal, the DCDC converter 122 to adjust the equivalent output impedance of the battery assembly 12, so that the discharge power or the discharge current of the battery assembly 12 changes.

Usually, a larger pulse width of the first signal leads to a smaller value of the equivalent output impedance of the battery assembly 12, and a larger discharge power or a larger discharge current of the battery assembly 12. A smaller pulse width of the first signal leads to a larger value of the equivalent output impedance of the battery assembly 12, and a smaller discharge power and a smaller discharge current of the battery assembly 12.

It should be noted that an implementation of the battery assembly 12 is not limited to the implementation.

A quantity of electrical loads 20 and a type are not limited. When a quantity of secondary loads in the electrical load 20 is greater than 1, still referring to FIG. 1, the energy storage system 10 may further include a load shunt 15 and a load low voltage down (LLVD) contactor K3. In addition, when the electrical load 20 is electrically connected in parallel between the first busbar W1 and the second busbar W2, load circuit breakers (K41 and K42) are usually added between the electrical load 20 and the second busbar W2.

In some embodiments, when the electrical load 20 includes a first load 21, a first end of the first load 21 is electrically connected to the first busbar W1, and a second end of the first load 21 is electrically connected to the second busbar W2 by using the load circuit breaker K41 of the first load 21. The load circuit breaker K41 of the first load 21 may be configured to avoid an overcurrent existing when the first load 21 is short-circuited.

In some other embodiments, when the electrical load 20 includes a first load 21 and a second load 22, power is supplied to the second load 22 before the first load 21. In other words, the first load 21 is a secondary load, and the second load 22 is a primary load. In some embodiments, the first load 21 is configured to implement a 5G data service, and the second load 22 is configured to implement a voice service and a transmission service different from a 5G data service, for example, 2G/3G/4G service. It should be noted that, that the first load 21 is a secondary load and the second load 22 is a primary load herein is merely an example. Types of the first load 21 and the second load 22 are not limited.

For ease of description, one primary load and two secondary loads, namely, one second load 22 and two first loads 21 are used for illustration in FIG. 1. The two first loads 21 each are electrically connected to the second busbar W2 through the LLVD contactor K3 and the load shunt 15 by using the load circuit breaker K41, and the second load 22 is electrically connected to the second busbar W2 through the LLVD contactor K3 and the load shunt 15 by using the load circuit breaker K42. The power supply 30 provides a direct current to the second busbar W2 by using the power supply assembly 11, and the power supply assembly 11 may further monitor a state of the power supply 30. An implementation of the power supply assembly 11 is not limited.

In some embodiments, the power supply assembly 11 may include a rectifier unit. An input end of the rectifier unit is electrically connected to the power supply 30 (namely, an alternating current power supply), an output grounding end of the rectifier unit is electrically connected to the first busbar W1, and an output power supply end of the rectifier unit is electrically connected to the second busbar W2. The rectifier unit converts, into a direct current, an alternating current provided by the power supply 30, and the rectifier unit provides the direct current to the second busbar W2. An implementation of the rectifier unit is not limited. For example, the rectifier unit includes a rectifier circuit and a filter circuit. In addition, the power supply 30 may be energy such as wind energy.

In some other embodiments, the power supply assembly 11 may alternatively include a DCDC power converter. An input end of the DCDC power converter is electrically connected to the power supply 30 (namely, a direct current power supply), an output grounding end of the DCDC power converter is electrically connected to the first busbar W1, an output power supply end of the DCDC power converter is electrically connected to the second busbar W2, and the DCDC power converter provides a direct current to the second busbar W2. An implementation of the DCDC power converter is not limited. The power supply 30 may be energy such as a high voltage direct current (HVDC) or a solar panel.

In addition, the energy storage system 10 may further include a monitoring unit 14. The monitoring unit 14 is electrically connected to the power supply assembly 11, and the monitoring unit 14 is further electrically connected to a control end of the LLVD contactor K3 and the BLVD contactor K1. In addition, the monitoring unit 14 may be electrically connected in parallel between the first busbar W1 and the second busbar W2, to obtain electrical energy, so that the monitoring unit 14 normally operates.

When the power supply 30 encounters the power failure, the power supply assembly 11 may send a power failure alarm signal to the monitoring unit 14, so that the monitoring unit 14 controls the LLVD contactor K3 to be disconnected, and the secondary load (namely, the first load 21) is cut off from the energy storage system 10. A representation form of the power failure alarm signal is not limited.

In an actual application process, after the power supply 30 encounters the power failure, the battery assembly needs to supply power to the electrical load 20, so that the electrical load 20 can maintain operation. That the electrical load 20 includes the first load 21 is used as an example. When the battery assembly supplies power to the first load 21, the battery assembly, the first busbar W1, the second busbar W2, and the first load 21 may form a circuit loop.

When the battery assembly is an existing lead-acid battery, if the first load 21 is short-circuited, the existing lead-acid battery outputs a discharge current of hundreds to thousands of amperes, and the discharge current is uncontrollable, bringing a safety hazard to the entire energy storage system. Therefore, the existing lead-acid battery needs to be configured with an expensive direct current fuse (in other words, the switching module K2 is a direct current fuse), and then hierarchical short-circuit protection is implemented based on tripping current thresholds of the direct current fuse and the load switch K41 corresponding to the first load 21, and a time difference between the direct current fuse and the load switch K41 corresponding to the first load 21. However, the direct current fuse has high costs and a large volume.

Figure 2B:
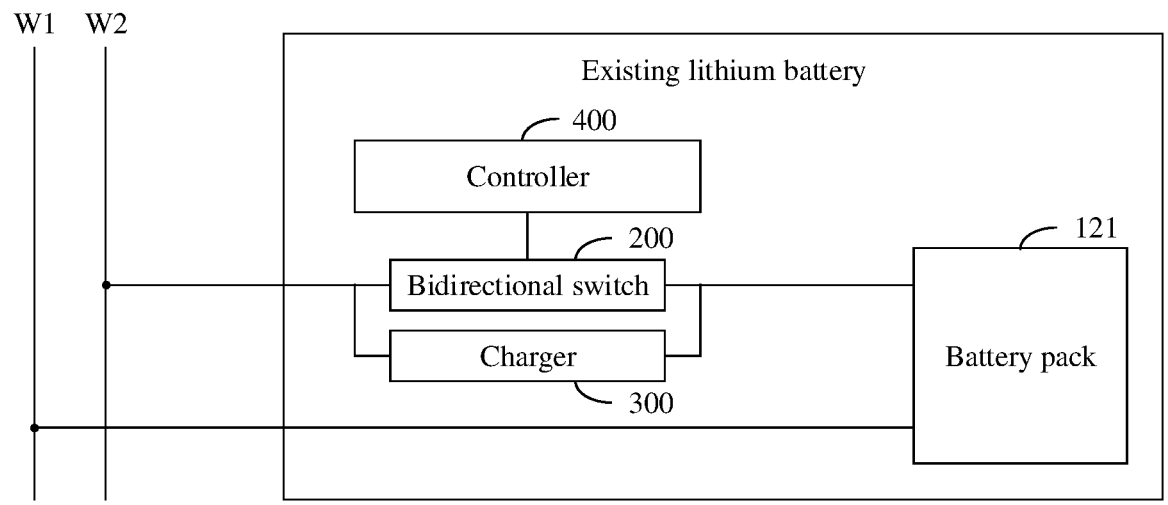
FIG. 2B is a schematic diagram of a structure of an existing lithium battery.

When the battery assembly is an existing lithium battery, as shown in FIG. 2B, the existing lithium battery may include the battery pack 121, a bidirectional switch 200, a charger 300, and a controller 400. A first end of the battery pack 121 is electrically connected to the second busbar W2 by using the bidirectional switch 200, and a second end of the battery pack 121 is electrically connected to the first busbar W1. The charger 300 is electrically connected in parallel to two sides of the bidirectional switch 200.

It should be noted that FIG. 2B shows only a feasible connection manner in which the existing lithium battery is connected to each of the first busbar W1 and the second busbar W2. Another module may be further included between the existing lithium battery and the first busbar W1 and/or between the existing lithium battery and the second busbar W2. This is not limited.

If the first load 21 is short-circuited, the bidirectional switch 200 cuts off the circuit loop when a discharge current output by the existing lithium battery reaches a threshold. The bidirectional switch 200 may include but is not limited to a component such as a contactor, a relay, or two power semiconductor devices (for example, a bidirectional MOS transistor) connected in series.

A current in the circuit loop is uncontrollable and duration is short (usually several hundreds of microseconds), and it may be understood that the load circuit breaker K41 of the first load 21 is usually a mechanical switch. If the bidirectional switch 200 in the existing lithium battery is a bidirectional MOS transistor, the bidirectional MOS transistor is an electronic switch. Sensitivity of the electronic switch is higher than sensitivity of the mechanical switch. The mechanical switch may be tripped after a delay of a period of time and the electronic switch may be opened immediately after receiving a corresponding instruction. Therefore, the existing lithium battery may protect the existing lithium battery in advance and is electrically disconnected from the second busbar W2 before the first load 21, causing a risk that the busbar voltage in the energy storage system 10 is clamped by the short-circuited first load 21, and causing a phenomenon that the energy storage system 10 breaks down. If the bidirectional switch 200 is a contactor or a relay, when the first load 21 is short-circuited, the contactor or the relay is forcibly tripped under a short-circuit current, seriously damaging a contact in the contactor or the relay, or even causing the contact in the contactor or the relay to melt and adhere.

When the existing lead-acid battery or the existing lithium battery is used, and a load is short-circuited, there may be a safety risk and a system breakdown risk.

When the battery assembly 12 is used as the battery assembly, the first current greater than a maximum nominal discharge current of the battery assembly 12 and less than a short-circuit protection current of the battery assembly 12 is set. The first current is the discharge current output by the battery assembly 12 when the first load 21 is short-circuited. The maximum nominal discharge current of the battery assembly 12 is a maximum current allowed when the battery assembly 12 is normally discharged, and the short-circuit protection current of the battery assembly 12 is a current that can be used to break the electrical connection between the battery assembly 12 and the second busbar W2. A second current is a current that is used to break an electrical connection between the first load 21 and the second busbar W2, namely, the tripping current threshold of the load circuit breaker K41 of the first load 21. A person skilled in the art may understand that the second current is usually less than or equal to a maximum nominal current of the battery assembly 12. Therefore, the first current is greater than the second current.

Values of the first current, the second current, the short-circuit protection current of the battery assembly 12, and the maximum nominal discharge current of the battery assembly 12 are not limited. In some embodiments, in a scenario in which there is a large load, when a capacity of the load circuit breaker (K41 or K42) is configured, the tripping current threshold may approach or even exceed the maximum nominal discharge current of the battery assembly 12. The capacity of the load circuit breaker herein is a maximum current that is allowed to pass through the load switch when the load circuit breaker is not tripped. For example, the first current may be set to be greater than 50% of the maximum nominal discharge current of the battery assembly 12, and the second current is set to be greater than 25% to 30% of the maximum nominal discharge current of the battery assembly 12.

Based on the configuration, the battery assembly 12 has a characteristic of a short-circuit current-limitation output. When a load is short-circuited, an amplitude of the first current output by the battery assembly 12 may be greater than an amplitude of the maximum nominal discharge current of the battery assembly 12 and less than an amplitude of the short-circuit protection current of the battery assembly 12, so that duration of the first current output by the battery assembly 12 may be controllable, the first load 21 may be electrically disconnected from the second busbar W2 before the battery assembly 12, and the busbar voltage in the energy storage system 10 can be automatically restored, to avoid a risk that the energy storage system 10 breaks down.

In some embodiments, the battery assembly 12 may determine, based on the port voltage of the battery assembly 12 in the discharging state and the first preset voltage, whether the first load 21 is short-circuited. When the port voltage of the battery assembly 12 in the discharging state is less than or equal to the first preset voltage, it may be determined that the first load 21 is short-circuited. If the first load 21 is short-circuited, because the first current is set to be greater than the maximum nominal discharge current of the battery assembly 12 and less than the short-circuit protection current of the battery assembly 12, the battery assembly 12 may control, based on the first signal, the DCDC converter 122 to decrease the equivalent output impedance of the battery assembly 12, so that the discharge current of the battery assembly 12 increases. Therefore, the battery assembly 12 can output the first current whose amplitude and duration are stable and controllable, and the first current is greater than the second current, so that the first load 21 is electrically disconnected from the second busbar W2 before the battery assembly 12. Therefore, the short-circuited first load 21 is cut off from the energy storage system 10, and the busbar voltage in the energy storage system 10 is automatically restored.

In some embodiments, when the first load 21 is short-circuited, the control unit 123 in the battery assembly 12 may increase the pulse width of the first signal (namely, a third pulse width), so that the equivalent output impedance of the battery assembly 12 decreases, the first current output by the battery assembly 12 increases, and the first current output by the battery assembly 12 is greater than the maximum nominal current of the battery assembly 12.

The third pulse width of the first signal may be set based on the maximum nominal current of the battery assembly 12 and the second current.

In some embodiments, the second current is the tripping current threshold of the load circuit breaker K41 of the first load 21. Therefore, the first load 21 is automatically disconnected by using the load circuit breaker K41 of the first load 21. In other words, the load circuit breaker K41 of the first load 21 is tripped, so that the first load 21 is electrically disconnected from the second busbar W2, the first load 21 is cut off from the energy storage system 10, and the DCDC converter 122 and the second busbar W2 may continue to be electrically connected, to ensure that the battery assembly 12 can continue to supply power to another load In the electrical load 20.

Figure 3:
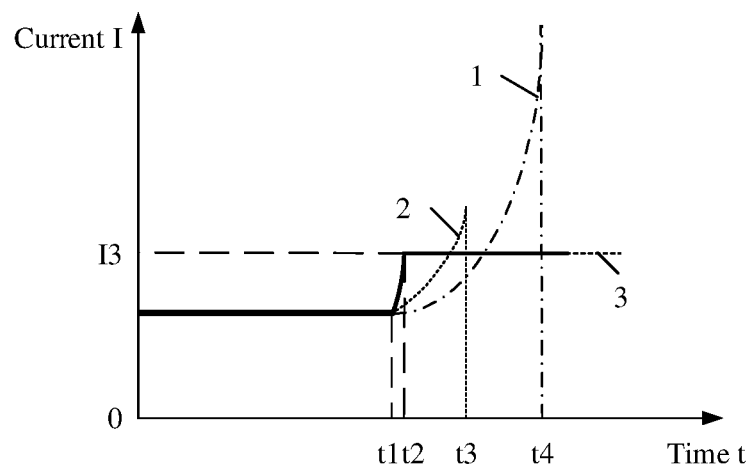
FIG. 3 is a schematic diagram of a time sequence of a short-circuit current-limitation output of a battery assembly according to an embodiment.

With reference to FIG. 3, the following provides an example description of a change in the discharge current of the existing lead-acid battery, the existing lithium battery, and the battery assembly 12.

FIG. 3 is a schematic diagram of a time sequence of a short-circuit current-limitation output of a battery assembly according to an embodiment. In FIG. 3, a horizontal coordinate represents time t, and a vertical coordinate represents a current I. A curve 1 is a curve indicating that the discharge current of the existing lead-acid battery changes with time when the first load 21 is short-circuited, a curve 2 is a curve indicating that the discharge current of the existing lithium battery changes with time when the first load 21 is short-circuited, and a curve 3 is a curve indicating that the discharge current of the battery assembly 12 changes with time when the first load 21 is short-circuited.

As shown in FIG. 3, the first load 21 is short-circuited at a moment t1, so that amplitudes of the discharge current of the existing lead-acid battery, the discharge current of the existing lithium battery, and the discharge current of the battery assembly 12 all increase after the moment t1. For the battery assembly 12, the DCDC converter 122 outputs a first current I3 at a moment t2, so that an amplitude of the first current I3 of the battery assembly 12 is greater than the amplitude of the maximum nominal discharge current of the battery assembly 12 and less than the amplitude of the short-circuit protection current of the battery assembly 12, and duration of the first current I3 is stable and controllable. The first current I3 is greater than the second current, so that the load switch K41 of the first load 21 is automatically tripped, and the busbar voltage in the energy storage system is automatically restored. For the existing lithium battery, at a moment t3, the bidirectional switch quickly cuts off an electrical connection between the existing lithium battery and the second busbar W2, so that the discharge current of the existing lithium battery becomes zero, causing the existing lithium battery to be deadlocked, and causing the phenomenon that the energy storage system breaks down. For the existing lead-acid battery, the direct current fuse breaks an electrical connection between the existing lead-acid battery and the second busbar W2 at a moment t4, so that the discharge current of the existing lead-acid battery becomes zero.

Therefore, compared with the curve 1, the battery assembly 12 can automatically limit the current when the first load 21 is short-circuited, and does not need to be configured with an expensive direct current fuse as the existing lead-acid battery within a safe range. Compared with the curve 2, the battery assembly 12 resolves a problem that when the first load 21 is short-circuited, the existing lithium battery is deadlocked and consequently, the energy storage system breaks down, and normal operation of the battery assembly 12 does not need to be manually restored, or the short-circuited first load 21 does not need to be manually removed, to reduce maintenance costs.

Therefore, the battery assembly 12 and the electrical load 20 may cooperate, after the electrical load 20 is short-circuited, the electrical load 20 is cut off from the busbar voltage in the energy storage system 10 before the battery assembly 12. In addition, the amplitude and duration of a short-circuit discharge current of the battery assembly 12 may be configured by a user, to increase flexibility of the energy storage system 10.

In an actual application scenario, that a load is short-circuited poses a risk that the energy storage system breaks down, and that the power supply encounters the power failure also affects power backup reliability of the energy storage system. An existing energy storage system usually supports both the 5G data service and 2G/3G/4G voice and transmission services. That the electrical load 20 includes the first load 21 and the second load 22 is used as an example. The second load 22 supplies power before the first load 21. In other words, the first load 21 is a secondary load, and the second load 22 is a primary load. When a battery assembly in the existing energy storage system is in the charging state or the standby state, and the power supply 30 encounters the power failure, the battery assembly may transition from the charging state or the standby state to the discharging state and the battery assembly may supply power to the electrical load 20, and both the first load 21 and the second load 22.

In the conventional technology, if the power supply 30 encounters the power failure, the monitoring unit in the existing energy storage system usually first controls the secondary load to be powered off, and then controls the primary load to be powered off, so that hierarchical powering off is performed, to ensure that the power backup duration of the primary load can be prolonged when a low battery capacity is configured.

An implementation process may include: After the power supply 30 encounters the power failure, an existing battery assembly in the existing energy storage system supplies power to both the primary load and the secondary load, and the monitoring unit detects the busbar voltage in real time. When the busbar voltage decreases to an LLVD point as discharge duration increases, the monitoring unit in the existing energy storage system controls the secondary load to be powered off, and until the busbar voltage reaches a BLVD point, the monitoring unit in the existing energy storage system controls the BLVD contactor K1 to operate, to separate the existing battery assembly from the existing energy storage system.

Because the battery assembly is usually expensive, in many scenarios, in the existing energy storage system, a capacity of the existing battery assembly (namely, I2*T11) only needs to be configured based on a current I2 and power backup duration T11 of the primary load. In such a configuration condition, an initial discharge ratio existing after the power supply encounters the power failure is IL/(I2*T11), where IL is a sum of the current I2 of the primary load and a current I1 of the secondary load. If IL is far greater than I2, an actual discharge ratio (Ratio=Current/Capacity) of the existing battery assembly is to be very large. In this case, there are the following two problems:

Problem 1: A polarization characteristic of the existing battery assembly is very serious, a port voltage of the existing battery assembly drops fast, and a hierarchical powering off effect is not ideal.

Problem 2: If the actual discharge ratio of the existing battery assembly is far greater than 1C, overcurrent protection is performed on the existing battery assembly, causing the existing battery assembly to be automatically protected and to be separated from the existing energy storage system, and causing the phenomenon that the existing energy storage system breaks down.

When the power supply 30 encounters the power failure, the power supply assembly 11 may send the power failure alarm signal to the monitoring unit 14. When receiving the power failure alarm signal, the monitoring unit 14 controls the LLVD contactor K3 to be disconnected, so that the first load 21 is powered off. In addition, the battery assembly 12 transitions from the charging state or the standby state to the discharging state after determining that the power supply 30 encounters the power failure, so that the battery assembly 12 supplies power to the electrical load 20.

Because the port voltage of the battery assembly 12 quickly drops when the power supply 30 encounters the power failure, the battery assembly 12 may determine, based on the port voltage of the battery assembly 12 in the charging state or the standby state, whether the power supply 30 encounters the power failure. For example, the control unit 123 in the battery assembly 12 may determine a value of the port voltage of the battery assembly 12 in the charging state or the standby state and a value of the second preset voltage, to determine whether the power supply 30 encounters the power failure, and further control the battery assembly 12 to transition from the charging state or the standby state to the discharging state. For example, when the port voltage of the battery assembly 12 in the charging state or the standby state is less than or equal to the second preset voltage, the battery assembly 12 may determine that the power supply 30 encounters the power failure, so that the battery assembly 12 transitions from the charging state or the standby state to the discharging state.

In addition, because the monitoring unit 14 controls a delay in disconnecting the LLVD contactor K3, a discharge capability (namely, the discharge power or the discharge current) of the battery assembly 12 in a time period from a time point at which the power supply 30 encounters the power failure to a time point at which the first load 21 is powered off is set to be greater than the maximum nominal discharge capability (namely, a maximum nominal discharge power or the maximum nominal discharge current). The maximum nominal discharge power of the battery assembly 12 is a maximum power allowed when the battery assembly 12 is normally discharged. After the first load 21 is powered off, the discharge capability of the battery assembly 12 is restored to the maximum nominal discharge capability. In other words, before the power supply 30 encounters the power failure, the discharge capability of the battery assembly 12 is the maximum nominal discharge capability.

In some embodiments, the battery assembly 12 adjusts the equivalent output impedance of the battery assembly 12 based on the first signal, so that a discharge power of the battery assembly 12 in the time period from the time point at which the power supply 30 encounters the power failure to the time point at which the first load 21 is powered off is greater than the maximum nominal discharge power of the battery assembly 12, the battery assembly 12 is restored to the maximum nominal discharge power after the first load 21 is powered off, and an actual discharge power of the battery assembly 12 depends on a load amount of the primary load.

Alternatively, the battery assembly 12 adjusts the equivalent output impedance of the battery assembly 12 based on the first signal, so that a discharge current of the battery assembly 12 in the time period from the time point at which the power supply 30 encounters the power failure to the time point at which the first load 21 is powered off is greater than the maximum nominal discharge current of the battery assembly 12, the battery assembly 12 is restored to the maximum nominal discharge current after the first load 21 is powered off, and an actual discharge current of the battery assembly 12 depends on a load amount of the primary load.

In some embodiments, when the battery assembly 12 transitions from the charging state or the standby state to the discharging state, the control unit 123 in the battery assembly 12 may increase the pulse width (namely, a first pulse width) of the first signal, so that the equivalent output impedance of the battery assembly 12 decreases, and the discharge power or the discharge current of the battery assembly 12 increases. After preset duration, the battery assembly 12 may decrease the pulse width of the first signal (namely, a second pulse width), so that the equivalent output impedance of the battery assembly 12 increases, and the discharge power or the discharge current of the battery assembly 12 decreases, in other words, the battery assembly 12 is restored to the maximum nominal discharge power, or the battery assembly 12 is restored to the maximum nominal discharge current, to restore normal operation of the battery assembly 12. The first pulse is greater than the second pulse.

A start moment of the preset duration is a moment at which the battery assembly 12 transitions from the charging state or the standby state to the discharging state. A value of the preset duration is not limited. A discharge capability of the DCDC converter 122 in the battery assembly 12 may be controlled based on a power of a total load. Therefore, the discharge capability (namely, the discharge power or the discharge current) of the battery assembly 12 can support the total load. Based on this, a backup capacity of the battery assembly 12 may be configured based on only a power (or a current) and the power backup duration of the primary load.

Compared with the conventional technology, when the power supply 30 encounters the power failure, the monitoring unit 14 monitors the power failure alarm signal to control the secondary load to be powered off, without a need to collect the busbar voltage to control a sequence of performing hierarchical powering off, and without a need to depend on a setting of two parameters of the LLVD point and the BLVD point, to avoid a case in which the polarization characteristic of the existing battery assembly affects the hierarchical powering off effect in a case of large-rate discharging, and avoid a case in which the existing battery assembly triggers an overcurrent protection action in a case of short-time large-rate discharging.

In addition, after the battery assembly 12 transitions from the charging state or the standby state to the discharging state, the discharge capability is improved in a time period before the secondary load is powered off, and the power can be supplied to both the primary load and the secondary load, to ensure that the energy storage system 10 does not encounter the power failure, and avoid the phenomenon that the energy storage system breaks down. After the secondary load is powered off, the discharge capability of the battery assembly 12 is restored to the maximum nominal discharge capability, and in this case, the battery assembly 12 provides a power backup only for the primary load. Therefore, when the battery assembly 12 is configured with a small capacity, the power backup duration of the primary load is basically not affected.

That the first load 21 is a secondary load and the second load 22 is a primary load is used as an example. In the time period from the time point at which the power supply 30 encounters the power failure to the time point at which the first load 21 is powered off, the battery assembly 12 has a short-time overload discharge capability, so that the battery assembly 12 supplies power to the first load 21 and the second load 22, and supports the total load in the energy storage system 10, to avoid the phenomenon that the energy storage system breaks down. After the first load 21 is powered off, the battery assembly 12 supplies power to the second load 22, to ensure the power backup duration of the primary load. Therefore, a capacity configuration of the battery assembly 12 in the energy storage system 10 is reduced, the quantity of battery assemblies 12 in the energy storage system 10 is reduced, and costs are reduced.

Figure 4A:
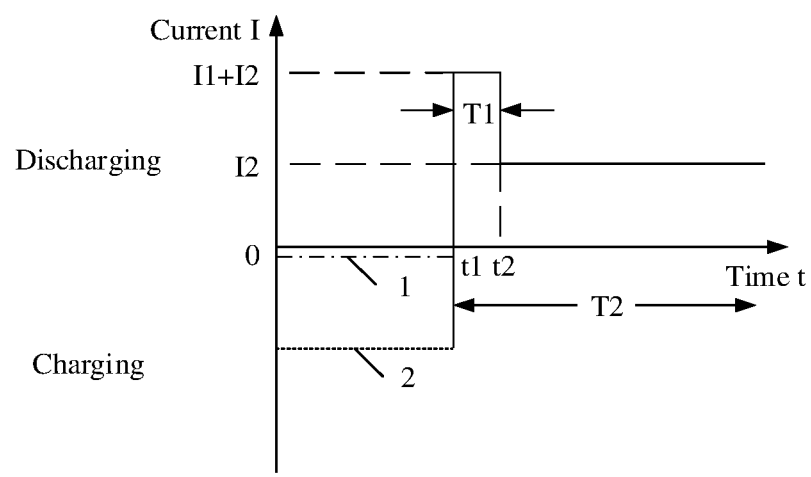
FIG. 4A is a schematic diagram of a time sequence from charging to discharging of a battery assembly according to an embodiment.
Figure 4B:
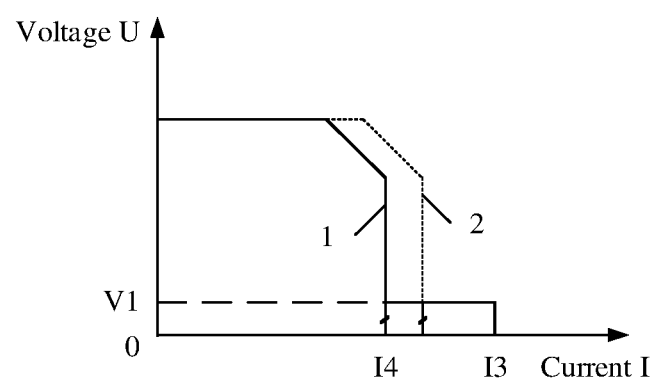
FIG. 4B is a diagram of a voltage U-current I external characteristic curve of a battery assembly according to an embodiment.
Figure 4C:
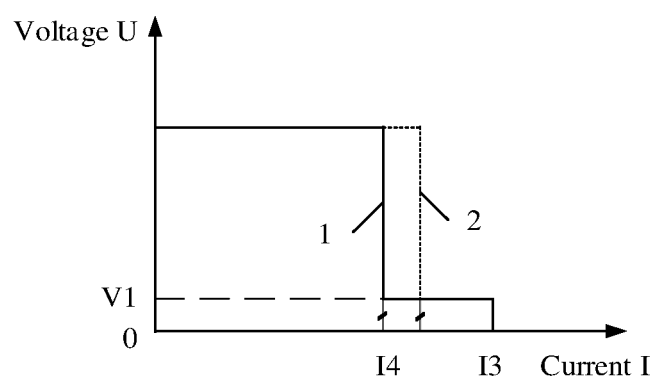
FIG. 4C is a diagram of a voltage U-current I external characteristic curve of a battery assembly according to an embodiment.

With reference to FIG. 4A to FIG. 4C, the following provides an example description of an operating process of the battery assembly 12 after the power supply 30 encounters the power failure.

FIG. 4A is a schematic diagram of a time sequence from charging to discharging of a battery assembly according to an embodiment. In FIG. 4A, a horizontal coordinate represents time t, and a vertical coordinate represents a current I.

As shown in FIG. 4A, in a time period from 0 to t1, the battery assembly 12 is in the charging state. In other words, a curve indicating that the battery assembly 12 is in the charging state may be a curve 1 or a curve 2. The curve 1 represents that the battery assembly 12 is in a float charging state, and the curve 2 represents that the battery assembly 12 is in the equalized charging state. At a moment t1, the power supply 30 encounters the power failure. In this case, the battery assembly 12 supplies power to the first load 21 and the second load 22, and the discharge current of the battery assembly 12 is I1+I2. At a moment t2, in other words, after a time period T1, the first load 21 is cut off from the energy storage system 10, the battery assembly 12 supplies power to the second load 22, and the discharge current of the battery assembly 12 becomes I2. I1 is a discharge current at which the battery assembly 12 supplies power to the first load 21, and I2 is a discharge current at which the battery assembly 12 supplies power to the second load 22.

Therefore, the battery assembly 12 has a short-time overload discharge capability in the time period T1, the discharge power (or the discharge current) of the battery assembly 12 is greater than a discharge power (or a discharge current) that is of the battery assembly 12 and that exists after the moment t2, and a discharge power (or a discharge current) of the battery assembly 12 in the time period T1 is also stable and controllable. A discharge capability that is of the battery assembly 12 and that exists after the moment t2 is restored to the maximum nominal discharge capability, so that the battery assembly 12 continues to supply power based on a discharge power (or a discharge current) of normal operation.

FIG. 4B and FIG. 4C each are a diagram of a voltage U-current I external characteristic curve of a battery assembly according to an embodiment. In FIG. 4B and FIG. 4C, a horizontal coordinate is a current I, and a vertical coordinate is a voltage V.

An operating mode of the battery assembly 12 may include any one of a constant voltage mode, a constant power mode, or a constant current mode shown in FIG. 4B. When the battery assembly 12 is in the constant voltage mode, the DCDC converter 122 may ensure that the battery assembly 12 can output a constant voltage. The operating mode of the battery assembly 12 may further include a simulated operating mode of a real battery shown in FIG. 4C. Ie port voltage may gradually decrease as discharge time is prolonged.

A curve 1 represents a battery assembly 12 having only a short-time overload discharge capability. A curve 2 represents a battery assembly 12 having both the characteristic of the short-circuit current-limitation output and the short-time overload discharge capability.

With reference to FIG. 4B and FIG. 4C, regardless of an operating mode of the battery assembly 12, after the power supply 30 encounters the power failure, in the time period from the time point at which the power supply 30 encounters the power failure to the time point at which the first load 21 is powered off, the voltage U-current I external characteristic curve of the battery assembly 12 changes from the curve 1 to the curve 2. Therefore, the battery assembly 12 has the short-time overload discharge capability, and the battery assembly 12 supplies power to the first load 21 and the second load 22. After the first load 21 is powered off, the battery assembly 12 supplies power to the second load 22.

In addition, when the port voltage of the battery assembly 12 in the discharging state drops to a voltage V1 (namely, the first preset voltage), the battery assembly 12 may determine that the first load 21 is short-circuited. Therefore, the battery assembly 12 controls, based on the first signal, an amplitude of the discharge current of the battery assembly 12 below an operating point V1 to be greater than a maximum nominal discharge current above the operating point V1 and less than the short-circuit protection current of the battery assembly 12, and controls an amplitude and duration of the discharge current of the battery assembly 12 below the operating point V1 to be stable and controllable, in other words, the current of the battery assembly 12 increases from a current I4 to the current I3 (namely, the first current). The current I4 is a maximum nominal discharge current existing when the battery assembly 12 normally operates.

In conclusion, the battery assembly not only has the characteristic of the short-circuit current-limitation output, but also has the short-time overload discharge capability. It should be noted that the battery assembly may have only the characteristic of the short-circuit current-limitation output or may have only the short-time overload discharge capability or may have both the characteristic of the short-circuit current-limitation output and the short-time overload discharge capability.

For example, the embodiments may further provide user equipment. A device in the embodiments may include an electrical load 20 and an energy storage system 10.

An implementation of the user equipment is not limited.

A power supply 30 is configured to supply power to the energy storage system 10 and the electrical load 20. The energy storage system 10 supplies power to the electrical load 20, to ensure that an electrical device normally operates. The electrical load 20 may include a transceiver device, and the transceiver device is configured to: receive a signal or transmit a signal. In addition, the electrical device may further include a control device, and the control device may control the transceiver device to receive a signal or send a signal.

The electrical device may be configured to perform the solutions in the embodiments shown in FIG. 1 to FIG. 4C. Implementation principles and effects of the electrical device are similar. For an implementation operation of each module, refer to related descriptions of the method embodiments. Details are not described herein again.

The foregoing descriptions are merely implementations, but are not intended to limit the scope of the embodiments. Any variation or replacement readily figured out by a person skilled in the art shall fall within the scope of the embodiments.

What is claimed is:

1. A battery assembly, comprising:
   a control unit; and
   a DCDC converter, wherein
   the control unit is configured to: when a first load is short-circuited in a process in which the battery assembly supplies power to the first load, control the DCDC converter to output a first current; and
   the first current is greater than a maximum nominal discharge current of the battery assembly, is used to break an electrical connection between the first load and a busbar, and is less than a short-circuit protection current of the battery assembly; the maximum nominal discharge current of the battery assembly is a maximum current allowed when the battery assembly is normally discharged; and the short-circuit protection current of the battery assembly is a current that can be used to break an electrical connection between the battery assembly and the busbar.

2. The battery assembly according to claim 1, wherein the battery assembly further comprises a battery pack;

a first end of the DCDC converter is electrically connected to a positive electrode of the battery pack, a second end of the DCDC converter is electrically connected to a negative electrode of the battery pack, a third end of the DCDC converter is electrically connected to a first busbar, a fourth end of the DCDC converter is electrically connected to a second busbar, a fifth end of the DCDC converter is electrically connected to the control unit, the first busbar and the second busbar are configured to provide a direct current, and the first load is electrically connected in parallel between the first busbar and the second busbar;

the control unit is further configured to: when the first load is short-circuited, control, based on a third pulse width of a first signal, the DCDC converter to decrease equivalent output impedance of the battery assembly, to control a discharge current of the battery assembly to be the first current; and the first signal represents a duty cycle of a power switching transistor in the DCDC converter, and a pulse width of the first signal is used to adjust the equivalent output impedance of the battery assembly, to control the discharge current of the battery assembly.

3. The battery assembly according to claim 1, wherein the control unit is further configured to: monitor a port voltage of the battery assembly in a discharging state; and when the port voltage of the battery assembly in the discharging state is less than or equal to a first preset voltage, control the DCDC converter to output the first current.

4. The battery assembly according to claim 2, wherein the control unit is further configured to: monitor a port voltage of the battery assembly in a discharging state; and when the port voltage of the battery assembly in the discharging state is less than or equal to a first preset voltage, control the DCDC converter to output the first current.

5. A battery assembly, comprising:
a control unit; and
a DCDC converter, wherein
the control unit is configured to: after a power supply encounters a power failure, control a discharge capability of the battery assembly to be greater than a maximum nominal discharge capability of the battery assembly, and supply power to a first load and a second load by using a DCDC converter; and after the first load is powered off, control the discharge capability of the battery assembly to be restored to the maximum nominal discharge capability, and supply power to the second load by using the DCDC converter; and
the power supply is configured to provide a direct current to the first load and the second load before the power supply encounters the power failure, and power is supplied to the second load before the first load.

6. The battery assembly according to claim 5, wherein when the discharge capability of the battery assembly is represented by using a discharge power of the battery assembly, the control unit is configured to: after the power supply encounters the power failure, control the discharge power of the battery assembly to be greater than a maximum nominal discharge power in a time period from a time point at which the power supply encounters the power failure to a time point at which the first load is powered off, wherein the maximum nominal discharge power is a maximum power allowed when the battery assembly is normally discharged; and after the first load is powered off, control the battery assembly to be restored to the maximum nominal discharge power; or when the discharge capability of the battery assembly is represented by using a discharge current of the battery assembly, the control unit is configured to: after the power supply encounters the power failure, control the discharge current of the battery assembly to be greater than a maximum nominal discharge current in a time period from a time point at which the power supply encounters the power failure to a time point at which the first load is powered off, wherein the maximum nominal discharge current is a maximum current allowed when the battery assembly is normally discharged; and after the first load is powered off, control the battery assembly to be restored to the maximum nominal discharge current.

7. The battery assembly according to claim 5, wherein the first load is used to implement a 5G data service, and the second load is used to implement a voice service and a transmission service that are different from the 5G data service.

8. The battery assembly according to claim 5, wherein
the control unit is further configured to: when a port voltage of the battery assembly in a charging state or a standby state is less than or equal to a second preset voltage, control the discharge capability of the battery assembly to be greater than the maximum nominal discharge capability of the battery assembly.

9. The battery assembly according to claim 5, further comprising:
a battery pack;
a first end of the DCDC converter is electrically connected to a positive electrode of the battery pack, a second end of the DCDC converter is electrically connected to a negative electrode of the battery pack, a third end of the DCDC converter is electrically connected to a first busbar, a fourth end of the DCDC converter is electrically connected to a second busbar, a fifth end of the DCDC converter is electrically connected to the control unit, the first busbar and the second busbar are configured to provide a direct current by using the power supply, and the first load and the second load are electrically connected in parallel between the first busbar and the second busbar;

the control unit is configured to control, based on a first pulse width of a first signal, the DCDC converter to decrease equivalent output impedance of the battery assembly, to control the discharge capability of the battery assembly to be greater than the maximum nominal discharge capability of the battery assembly; and after preset duration, control, based on a second pulse width of the first signal, the DCDC converter to increase the equivalent output impedance of the battery assembly, to control the discharge capability of the battery assembly to be restored to the maximum nominal discharge capability of the battery assembly; and the first pulse width is greater than or equal to the second pulse width, and a pulse width of the first signal is used to adjust the equivalent output impedance of the battery assembly, to control the discharge power or the discharge current of the battery assembly.

10. An energy storage system, comprising:
a power supply assembly;
a first busbar;
a second busbar; and
a battery assembly wherein the battery assembly comprises a control unit and a DCDC converter,
the control unit is configured to: when a first load is short-circuited in a process in which the battery assembly supplies power to the first load, control the DCDC converter to output a first current; and
the first current is greater than a maximum nominal discharge current of the battery assembly, is used to break an electrical connection between the first load and a busbar, and is less than a short-circuit protection current of the battery assembly; the maximum nominal discharge current of the battery assembly is a maximum current allowed when the battery assembly is normally discharged; and the short-circuit protection current of the battery assembly is a current that can be used to break an electrical connection between the battery assembly and the busbar.

11. The energy storage system according to claim 10, further comprising:
a monitoring unit electrically connected to the power supply assembly, wherein
the power supply component is further configured to send a power failure alarm signal to the monitoring unit after a power supply encounters a power failure; and
the monitoring unit is further configured to: when receiving the power failure alarm signal, control a secondary load in an electrical load to be powered off.

12. The energy storage system according to claim 10, further comprising any one of the following:
a data center;
a communications station; or
an energy storage power station.

* * * * *